United States Patent
Mooney et al.

(10) Patent No.: US 6,606,504 B1
(45) Date of Patent: Aug. 12, 2003

(54) METHOD AND APPARATUS FOR ACTIVATING A RING SILENCED TELEPHONE

(76) Inventors: Philip D. Mooney, 508 DeKalb Pike, North Wales, PA (US) 19454; Syed S. Ali, 3947 Kilmer Ave., Allentown, PA (US)

( * ) Notice: Subject to any disclaimer, the term of this patent is extended or adjusted under 35 U.S.C. 154(b) by 0 days.

(21) Appl. No.: 09/576,388

(22) Filed: May 22, 2000

(51) Int. Cl.⁷ .................................................. H04B 1/38
(52) U.S. Cl. ...................................... 455/550; 455/575
(58) Field of Search .................................. 455/530, 575, 455/421, 229.1, 67.1, 566, 85, 11.1

(56) References Cited

U.S. PATENT DOCUMENTS

| | | | | |
|---|---|---|---|---|
| 5,192,947 A | * | 3/1993 | Neustein | 340/7.63 |
| 6,166,652 A | * | 12/2000 | Benvenuti | 340/825.49 |
| 6,351,639 B1 | * | 2/2002 | Motohashi | 455/420 |
| 6,363,265 B1 | * | 3/2002 | Ritter | 455/567 |
| 6,453,023 B1 | * | 9/2002 | McKee | 379/88.25 |

* cited by examiner

*Primary Examiner*—Thanh Cong Le
*Assistant Examiner*—Tu Nguyen

(57) ABSTRACT

A radio communication system, such as a cellular telephone system, in which the cellular telephones have a ring silenced mode of operation. A user of the system can remotely cause the telephone to exit the ringing silenced mode in case the telephone is misplaced and needs to be located by causing the telephone to ring and then listening for the ringing. The feature is also useful for disabling ring silenced mode when there is an emergency need to contact the owner of the telephone.

22 Claims, 2 Drawing Sheets

METHOD AND APPARATUS FOR ACTIVATING A RING SILENCED TELEPHONE

FIELD OF THE INVENTION

The invention pertains to radio telecommunication systems. More particularly, the invention pertains to cellular telephone and pager systems.

BACKGROUND OF THE INVENTION

Cellular telephones have become ubiquitous throughout much of the world. Pagers are also widely in use. In operation, a cellular telephone can transmit radio signals to and receive radio signals from a base station. In particular, an individual making a telephone call to a cellular telephone dials the telephone number of the cellular telephone. The telephone communications company through which the telephone call was placed transmits a signal via land lines to the cellular telephone company. The cellular telephone company, in turn, transmits a signal via land lines to a base station which can communicate with the selected cellular telephone. The base station then sends out a high frequency radio signal which can be received by the cellular telephone indicating that there is an incoming telephone call to that cellular telephone. In response to this signal, the cellular telephone rings. If and when the owner of the cellular telephone hears the ring signal and answers the call, a telephone conversation between the two parties can commence.

Pagers operate in essentially the same manner, except that a telephone call does not commence. Rather, the pager rings or vibrates responsive to receipt of the signal from the base station. The owner will then know he has a telephone call. Most modern pagers have a display panel which can display the telephone number of the calling party. The owner can then find a telephone and return the call.

Some pagers as well as cellular telephones have a "ringing silenced" mode. In this mode, the cellular telephone or pager can receive incoming telephone calls, but does not issue an audible ring. The telephone or pager instead may vibrate or have a visual indicator of an incoming call such as a blinking light. This feature is useful to some individuals because it may be necessary for them to know that a telephone call is being received, but without disturbing others around them. For instance, if an individual is in a meeting, this feature may be very useful.

However, if someone misplaces his or her cellular telephone or pager while it is the ringing silenced mode, this feature can be a nuisance. For instance, if the cellular telephone or pager is on but not in ringing silenced mode, someone can simply call the telephone number of the cellular telephone or pager and then listen for the ringing in order to be guided to the location of the misplaced device. Obviously, this method of locating a misplaced telephone cannot be used if the telephone is in the ringing silenced mode. Further, even if the telephone is not lost, there may be emergency instances when some one must contact the owner of the phone, which might be impossible if the telephone is in the ringing silenced mode.

Accordingly, it is an object of the present invention to provide an improved cellular telephone, pager or other radio communication device.

SUMMARY OF THE INVENTION

In accordance with the present invention, a radio communication device, such as a cellular telephone or pager, having a ringing silenced mode can be caused to exit ringing silenced mode remotely. Particularly, the cellular telephone and/or the cellular communication system to which the telephone is subscribed for service are set up to allow an individual to place a telephone call which will deactivate the ringing silenced mode. For instance, a user can call the cellular telephone company to cause the system to issue a predetermined radio signal which, when received by the particular telephone, causes it to exit ringing silenced mode and ring. Alternatively, for the situation where the telephone is misplaced, the cellular telecommunications system also may simultaneously disable voice mail so that the voice mail system will not divert the call after a limited number of rings, but will allow the telephone to ring continuously.

DETAILED DESCRIPTION OF THE INVENTION

The invention will be described below in connection with a cellular telephone which is subscribed for service with a cellular telephone service provider. However, it should be readily apparent to those skilled in the art that the invention is more broadly applicable to any radio communication device which is capable of receiving radio communications, such as a pager. In accordance with the present invention, the cellular telephone communication system is programmed or otherwise adapted to provide a "locate" feature that allows a user to selectively cause the system to transmit a signal to a selected cellular telephone instructing the telephone to exit ringing silenced mode. In addition, the cellular telephone itself must be equipped to recognize this signal and exit ringing silenced mode responsive to it.

A cellular telephone, of course, is already equipped to receive radio signals and process them in various ways depending on the signal. Cellular telephones normally comprise an integrated circuit microprocessor or digital signal processor. In accordance with the present invention, the microprocessor or digital signal processor circuitry within the telephone would simply need to be adapted to recognize one additional particular predetermined code received via radio signal and to deactivate the ringing silenced mode responsive to receipt of that signal.

In one embodiment, in addition to deactivating the ringer silenced mode, the telephone will also begin ringing in response to receipt of the locate code. The telephone may be programmed to issue a standard ring, as it would in response to a normal telephone call. Alternately, it may issue a distinctive ring or at least a particularly loud ring.

In one preferred embodiment of the invention, the locate feature is accessed through the cellular telephone service provider's voice mail system. In particular, most cellular telecommunication systems provide a voice mail service for their users. Specifically, when someone dials a telephone number of a particular cellular telephone, the system searches for the telephone and, if possible, causes it to ring or otherwise indicate that an incoming call is being made until the calling party hangs up or the voice mail system activates. If the telephone cannot be located or is not answered within a predetermined time period, which is typically about 5 to 6 standard rings (or about 15 seconds), the system ceases sending out the ring signal and instead puts the calling party into a voice mail system which allows the caller to leave a voice message for the user of the telephone.

Figure 1:
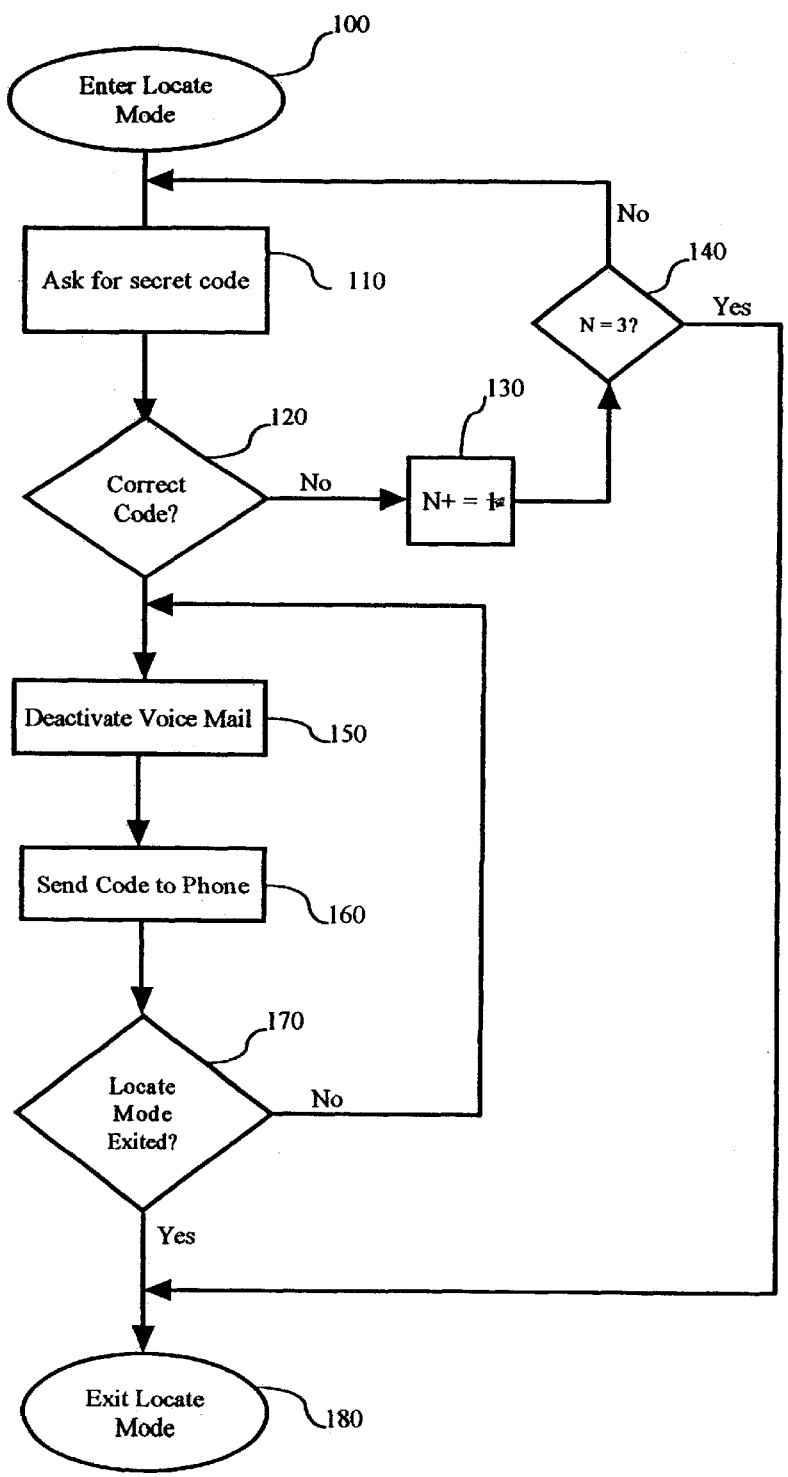
FIG. 1 is a flow chart illustrating the steps involved in the operation of the cellular telephone system in accordance with an embodiment of the present invention.

If a particular cellular telephone is misplaced and cannot be located by the owner, the owner can call the telephone number of the mis-located cellular telephone. Presumably, no one will answer the called cellular telephone and the user will be placed in the voice mail system. Alternately, the owner may dial a number that directly accesses the cellular telephone service provider's voice mail system. One of the options in that voice mail system will be to enter the locate mode. An individual can enter the locate mode either through a selection process in a voice menu system or by simply entering the proper code through the key pad of the telephone from which he or she is calling. The voice mail system will then enter the locate mode, the operation of which is illustrated in the flowchart of FIG. 1. In the first step, step 100, the system asks the user to enter a secret code. The secret code is a code which the owner of the telephone has previously set up for security purposes. It may be the same code that the owner uses to retrieve voice messages left for him or her. Note that, in some embodiments of the invention, the owner may have entered his or her secret code upon entering the voice mail system and, therefore, this step may be skipped. In step 110, the system checks if the code is correct. If not, the process flows to step 120 in which a counter is incremented. Flow then proceeds to step 130 in which it is determined whether the counter has reached a predetermined number, e.g., three. If not, flow proceeds back to step 100 where the user is asked to enter the secret code again. If the user enters the secret code incorrectly three times, the flow proceeds from step 130 to the end. However, assuming that the user enters the correct code before the time out, flow proceeds from step 110 to step 140. In step 140, the system deactivates the voice mail feature for the particular telephone. This is desirable so that the voice mail system does not activate and prevent the cellular telephone from ringing more than 5 or 6 times in a row. Step 140 is an optional step which may be omitted in certain embodiments of the invention.

Flow then proceeds to step 150 where the system sends a specific locate code to the telephone to cause the telephone to deactivate the ringer silenced mode and start ringing.

In step 160, the system checks if the user has exited locate mode. For instance, this may be done by simply hanging up the telephone at any point. If not, flow continues to loop through step 150 and 160 to continue to cause the cellular telephone to ring. When the user hangs up or otherwise exits the locate mode, the process ends.

Figure 2:
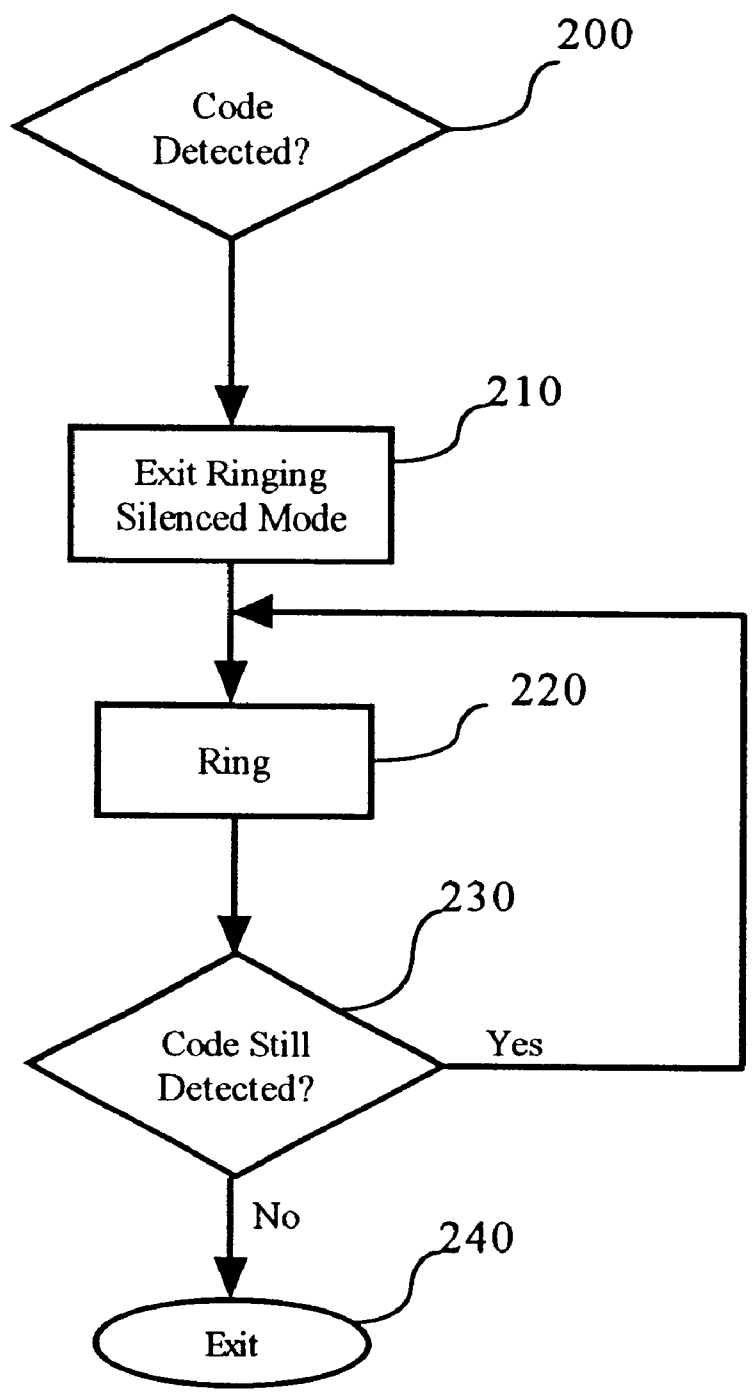
FIG. 2 is a flow chart illustrating the steps of operation of said cellular telephone in accordance with an embodiment of the present invention.

FIG. 2 is a flow chart illustrating operation at the cellular telephone responsive to receipt of the locate code which is sent in step 150 of FIG. 1. Particularly, when the locate code is received in step 200, flow proceeds to step 210 in which the telephone is caused to exit ringing silenced mode and starts to ring. The telephone will continue to ring until it no longer receives the code from the telecommunication system, i.e., when the user hangs up the telephone at the initiating location.

It should be understood by those skilled in the art that the description above is of merely one exemplary embodiment and that the invention can be implemented in numerous other ways. For instance, it may be desirable to implement this invention in a manner which requires modifications only in the cellular telephone and not in the telecommunication system itself.

For instance, the telephone can be programmed or otherwise adapted to exit ringing silenced mode responsive to receipt of a predetermined number of telephone calls (for example, three) originating from either the same initiating telephone number or one particular originating telephone number (the owners's home telephone) within a predetermined period of time (for example, one minute). In this particular embodiment, all the modifications necessary to implement the present invention are made within the telephone itself. No modifications are needed for the telecommunication system. Since caller ID is a feature which is typically already implemented in cellular telephones and cellular telephone systems, the ability to detect the telephone number of the call initiation location is already typically available in the cellular telephone.

In fact, the number of telephone calls and the time period in which they occur can be set to values that are commensurate with a true emergency situation, such as three calls within five minutes of each other. In this manner, in a true emergency, a caller may be able to deactivate the ringing silenced mode of the telephone without even being aware of the fact that such a feature exists.

In certain embodiments, in response to receipt of the locate code, the telephone exits ringing silenced mode and the telecommunication system disables voice mail for the particular telephone only while receiving the locate code. Alternately, the deactivation of voice mail and/or a ringing silenced mode may be permanent (until manually reactivated by the owner).

The latter embodiment may be preferable since the owner may not locate the telephone the first time he or she attempts to do so. For example, the owner may first attempt to locate the telephone when he or she is at home. If the owner does not locate it, the next day, he or she may try to locate the telephone while at work. In this embodiment, the owner need not go through the entire process of initiating the locate mode each time. Instead, the second and each subsequent time, the owner merely need dial the cellular telephone's number again.

On the other hand, the former embodiment described above may be preferable if it is important that the voice mail system remain active while the telephone is misplaced and/or that the telephone remain in ringing silenced mode, except when the owner is actually trying to locate it.

In other embodiments, caller ID enabled telephones may be configured to deactivate the ringing silenced mode whenever a call is received from a particular telephone number. The telephone number or numbers for which this type of operation is provided may be made programmable by the user. This feature may be useful for those users who wish calls from certain persons to be high priority and thus always ring through.

In even further embodiments, the telephone may be programmed to ring a certain number of times (e.g., fifty) or for a certain period of time (e.g., 5 minutes) when it receives the code to deactivate ringing silenced mode. In this manner, if the owner is using the feature to locate a misplaced telephone, the owner can activate the feature and then hang up the remote phone so that he or she can search for the phone without the need to keep the remote telephone off hook. Alternately, the telephone system itself can provide this same feature regardless of the programming of the telephone by simply sending out the specified code for a predetermined time period or until a predetermined number of rings has been reached.

The present invention also can be useful in situations not involving a lost telephone. For instance, there may be an emergency situation in which it is necessary to contact the owner of the telephone, but the telephone is in the ringing silenced mode. Someone who is aware of the feature and knows the owners' password (if the feature is password protected) can disable the ringing silenced mode remotely.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A radio communications apparatus having an audible notification device for signifying an event, said audible notification device capable of being disabled; the improvement comprising:

a device for remotely enabling said audible notification device responsive to a predetermined signal received via radio, wherein said predetermined signal is a plurality of telephone calls to said radio communications apparatus received from a single initiating telephone number within a predetermined period.

2. The apparatus of claim 1 wherein said radio communication apparatus is a telephone.

3. The apparatus of claim 2 wherein said radio communication apparatus is a cellular telephone.

4. The apparatus of claim 2 wherein said device for remotely enabling is responsive to a predetermined signal received via radio.

5. The apparatus of claim 4 wherein said audible notification device issues an audible signal that is unique responsive to receipt of said predetermined signal.

6. The apparatus of claim 4 wherein said device for remotely enabling comprises an integrated circuit.

7. The apparatus of claim 4 wherein said device for remotely enabling comprises a digital signal processor.

8. The apparatus of claim 4 wherein said audible notification device is a ringer for indicating an incoming telephone call and said ringer rings responsive to receipt of said predetermined signal.

9. The apparatus of claim 1 wherein said predetermined signal is three telephone calls to said telephone received from the same initiating telephone number within one minute of each other.

10. The apparatus of claim 1 wherein said predetermined signal is three telephone calls to said telephone received from the same initiating telephone number within five minutes of each other.

11. A radio communication apparatus comprising:

a receiver for receiving radio signals;

a ringing circuit that can be selectively disabled; and a circuit for remotely enabling said audible notification device responsive to a predetermined received radio signal; and a circuit for detecting a telephone number of a telephone from which an incoming telephone call to said radio communications device originates;

wherein said predetermined signal is a plurality of telephone calls to said radio communication apparatus received from a single initiating telephone number within a predetermined period.

12. The apparatus of claim 11 wherein said device for remotely enabling comprises an integrated circuit.

13. The apparatus of claim 12 wherein said integrated circuit comprises a digital signal processor.

14. The apparatus of claim 12 wherein said radio communication apparatus is a cellular telephone.

15. The apparatus of claim 11 wherein said audible notification device is a ringer for indicating an incoming telephone call and said ringer rings responsive to receipt of said predetermined signal.

16. A radio communication system comprising:

at least one base station for transmitting radio signals, including a predetermined radio signal;

a plurality of remote stations that can receive radio signals from said base station, each of said plurality of remote stations comprising a receiver for receiving radio signals, an audible notification circuit that can be selectively disabled, and a circuit for enabling said audible notification device responsive to receipt of said predetermined radio signal, wherein said predetermined signal is a plurality of telephone calls to said remote station received from a particular initiating telephone number within a predetermined period.

17. The system of claim 16 wherein said enabling circuit comprises an integrated circuit.

18. The system of claim 16 wherein said enabling circuit comprises a digital signal processor.

19. The system of claim 16 wherein said remote stations comprise cellular telephones.

20. The system of claim 16 wherein said circuit for enabling said audible notification device responsive to receipt of said predetermined signal enables said audible notification device only while receiving said predetermined signal.

21. A radio communication system comprising:

at least one base station for transmitting radio signals, including a predetermined radio signal;

a plurality of remote stations that can receive radio signals from said base station, each of said plurality of remote stations comprising a receiver for receiving radio signals, an audible notification circuit that can be selectively disabled, and a circuit for enabling said audible notification device responsive to receipt of said predetermined radio signal;

a voice mail system wherein a telephone call to a remote station that is not answered within a predetermined time period is normally diverted to said voice mail system;

means for disabling said voice mail system when said predetermined signal is being transmitted.

22. The system of claim 21 wherein said means for disabling said voice mail system disables said voice mail system permanently.

* * * * *